(12) United States Patent
Uthe

(10) Patent No.: US 8,898,256 B2
(45) Date of Patent: Nov. 25, 2014

(54) PRIORITIZATION OF APPLICATION COMPONENT DISTRIBUTION

(75) Inventor: Robert Thomas Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 2026 days.

(21) Appl. No.: 10/890,022

(22) Filed: Jul. 13, 2004

(65) Prior Publication Data

US 2006/0031371 A1 Feb. 9, 2006

(51) Int. Cl.
*G06F 15/16* (2006.01)
*H04L 5/00* (2006.01)
*G06F 9/445* (2006.01)
*H04L 12/851* (2013.01)

(52) U.S. Cl.
CPC ............... *G06F 8/65* (2013.01); *H04L 5/0058* (2013.01); *H04L 47/24* (2013.01)
USPC ........................................ 709/219; 220/221

(58) Field of Classification Search
CPC ....................................................... H04L 47/24
USPC .................. 709/230, 226, 219, 229, 220, 221
See application file for complete search history.

(56) References Cited

U.S. PATENT DOCUMENTS

| | | | |
|---|---|---|---|
| 5,418,953 A | 5/1995 | Hunt et al. | |
| 6,327,630 B1 | 12/2001 | Carroll et al. | |
| 6,341,303 B1 | 1/2002 | Rhee et al. | |
| 6,353,616 B1 | 3/2002 | Elwalld et al. | |
| 6,401,238 B1 | 6/2002 | Brown et al. | |
| 6,408,277 B1 | 6/2002 | Nelken | |
| 6,947,943 B2 * | 9/2005 | DeAnna et al. | 707/100 |
| 7,069,553 B2 * | 6/2006 | Narayanaswamy et al. | 717/173 |
| 7,313,120 B2 * | 12/2007 | Ekberg et al. | 370/338 |
| 2002/0013832 A1 * | 1/2002 | Hubbard | 709/220 |
| 2002/0078186 A1 | 6/2002 | Engel et al. | |
| 2002/0124064 A1 * | 9/2002 | Epstein et al. | 709/221 |
| 2002/0138571 A1 | 9/2002 | Trinon et al. | |
| 2003/0061265 A1 | 3/2003 | Maso et al. | |
| 2003/0163807 A1 | 8/2003 | Drake et al. | |

FOREIGN PATENT DOCUMENTS

| | | |
|---|---|---|
| JP | 7129373 | 5/1995 |
| JP | 2000099337 | 4/2000 |
| JP | 200347957 | 12/2000 |
| JP | 2001-296994 A | 10/2001 |

* cited by examiner

*Primary Examiner* — Adnan Mirza
(74) *Attorney, Agent, or Firm* — Steven M. Greenberg, Esq.; CRGO Law

(57) ABSTRACT

A method, system and apparatus for the prioritized distribution of application components based upon computing process impact. An application component distribution system which has been configured in accordance with the present invention can include a resource management system configured to manage communicatively coupled client computing devices over a computer communications network. A data store can be arranged to store prioritization data specifying which of the client computing devices are to first receive distributions of specified application components. Finally, a selective deployment processor can be programmed to selectively deploy application components to the client computing devices based upon the prioritization data.

16 Claims, 2 Drawing Sheets

PRIORITIZATION OF APPLICATION COMPONENT DISTRIBUTION

BACKGROUND OF THE INVENTION

1. Statement of the Technical Field

The present invention relates to application component distribution, and more particularly to the prioritization of application component distribution.

2. Description of the Related Art

Application component distribution involves the transfer of program logic from a source data store to a destination data store. Many years ago, application component distribution mostly included the duplication of one or more program files from removable media to permanent data storage in a target network domain. With the advent of global computing facilitated by the growth of the Internet, however, application component distribution often involves the electronic transfer of discrete portions of an application over several data communications networks into a target data store.

Application component distribution obviously contemplates the distribution of previously uninstalled application components. Notably, application component distribution also contemplates the upgrading and patching of a previous installation. In a primitive form of upgrading and patching, end users retrieve designated portions of application logic from a centralized data store. While placing the burden of upgrading and patching upon the end user can be convenient from the perspective both of the software distributor and the end user, in many circumstances, it will be ill-advised to rely upon end users to initiate the upgrading and patching process. In particular, in the modern enterprise, the application component distribution process is best left to information technologists.

In this regard, application component distribution remains an important aspect of information technology management. During the application lifecycle, several events can result in the upgrading or patching of one or more application components. Examples include application enhancements and modifications. More recently, design flaws and inoperable or malfunctioning portions of code require the patching of an application. In many cases, the design flaws have substantial security implications requiring a speedy resolution. In other circumstances, inoperable or malfunctioning portions of code result in an inability to complete mission critical transactions. As such, in many cases, the task of distributing application component upgrades and modifications will lie with information technology management.

In many circumstances, application component distribution involves multiple fan-out servers located about the globe. Through this network of fan-out servers, application component updates and patches can be distributed at a pace dictated by the level of urgency associated with the deployment of the application components. Where there is little urgency to distributing an update or patch, application component updates can be distributed over a substantial period of time. In contrast, where a deployment of a patch or update has been deemed critical, the opposite will be true.

When facing the urgency of deploying one or more application component updates or patches, the application component infrastructure may not be able to accommodate the simultaneous deployment of updates and patches to all recipients. Accordingly, often a choice must be made as to which clients are to receive a patch or update and which clients are to wait. Conventionally, these choices are made randomly or manually. For the smaller enterprise, an optimal selection can be approximated manually. For the larger enterprise, however, it is not possible for information technology management to aptly identify those clients requiring an immediate update and those clients for whom a delay in receiving an update or patch will be of no consequence.

In the modern era of computing, a trend has developed in the assembly and management of computing systems. Specifically, autonomic computing represents a leading edge strategy for creating and managing enterprise level computing systems and represents the principal challenge of computer science today. In the famed manifesto, *Autonomic Computing: IBM's Perspective on the State of Information Technology*, Paul Horn, Senior Vice President of IBM Research, observed, "It's not about keeping pace with Moore's Law, but rather dealing with the consequences of its decades-long reign." Given this observation, Horn suggested a computing parallel to the autonomic nervous system of the biological sciences. Namely, whereas the autonomic nervous system of a human being monitors, regulates, repairs and responds to changing conditions without any conscious effort on the part of the human being, in an autonomic computing system, the system must self-regulate, self-repair and respond to changing conditions, without requiring any conscious effort on the part of the computing system operator.

Thus, while the autonomic nervous system can relieve the human being from the burden of coping with complexity, so too can an autonomic computing system. Rather, the computing system itself can bear the responsibility of coping with its own complexity. The crux of the IBM manifesto relates to eight principal characteristics of an autonomic computing system:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.
Quite clearly, the conventional manner of deploying updates and patches in an application component distribution system falls far short of the eight tenants of autonomic computing.

SUMMARY OF THE INVENTION

The present invention addresses the deficiencies of the art in respect to application component distribution and provides a novel and non-obvious method, system and apparatus for the prioritized distribution of application components based upon computing process impact. An application component distribution system which has been configured in accordance with the present invention can include a resource management system configured to manage communicatively coupled client computing devices over a computer communications network. A data store can be arranged to store prioritization data specifying which of the client computing devices are to first receive distributions of specified application components. Finally, a selective deployment processor can be programmed to selectively deploy application components to the client computing devices based upon the prioritization data.

The prioritization data can specify which of the client computing devices are to first receive distributions of specified application components based upon respective associations with important ones of computing process operating in the computer communications network. In this regard, a rules-based selection processor can be configured to populate the data store with prioritization data based upon an application of prioritization rules to the operation of computing processes and associated ones of the client computing devices. Alternatively, an autonomic selection processor can be configured to populate the data store with prioritization data based upon autonomically acquired information regarding the operation of computing processes and associated ones of the client computing devices.

A method for prioritized application component distribution can include the step of deploying an application component to a set of client computing devices based upon a prioritization determined according to an association between the client computing devices and selected computing processes. Preferably, the selected computing processes can be critical business processes, though the invention is not limited in this regard. Additionally, in a preferred aspect of the invention, the association can be a participation by the client computing devices in the critical business processes.

Notably, the prioritization can be determined manually, in a rules-based fashion or in an autonomic fashion. In this regard, the method of the invention can include the steps of forming rules for establishing the prioritization and processing the rules to establish the prioritization. Alternatively, the method of the invention can include the steps of observing the operation of the computing processes, determining which of the computing processes are critical based upon the observing step, and prioritizing client computing devices which are associated with the computing processes which are determined to be critical.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for selectively deploying application components to client computing devices based upon client participation in critical computing processes. In accordance with the present invention, a critical computing processes can be associated with corresponding sets of one or more client computing devices. The association can be established, for example, through the manual application of an association, through the operation of manually established rules, or autonomically through observation of the operation of the critical computing processes. In any event, when it is determined that an application component is to be deployed, affected ones of the critical computing processes can be identified and those client computing devices associated with the identified critical computing processes can be selected to receive the deployment before other ones of the client computing devices.

Figure 1:
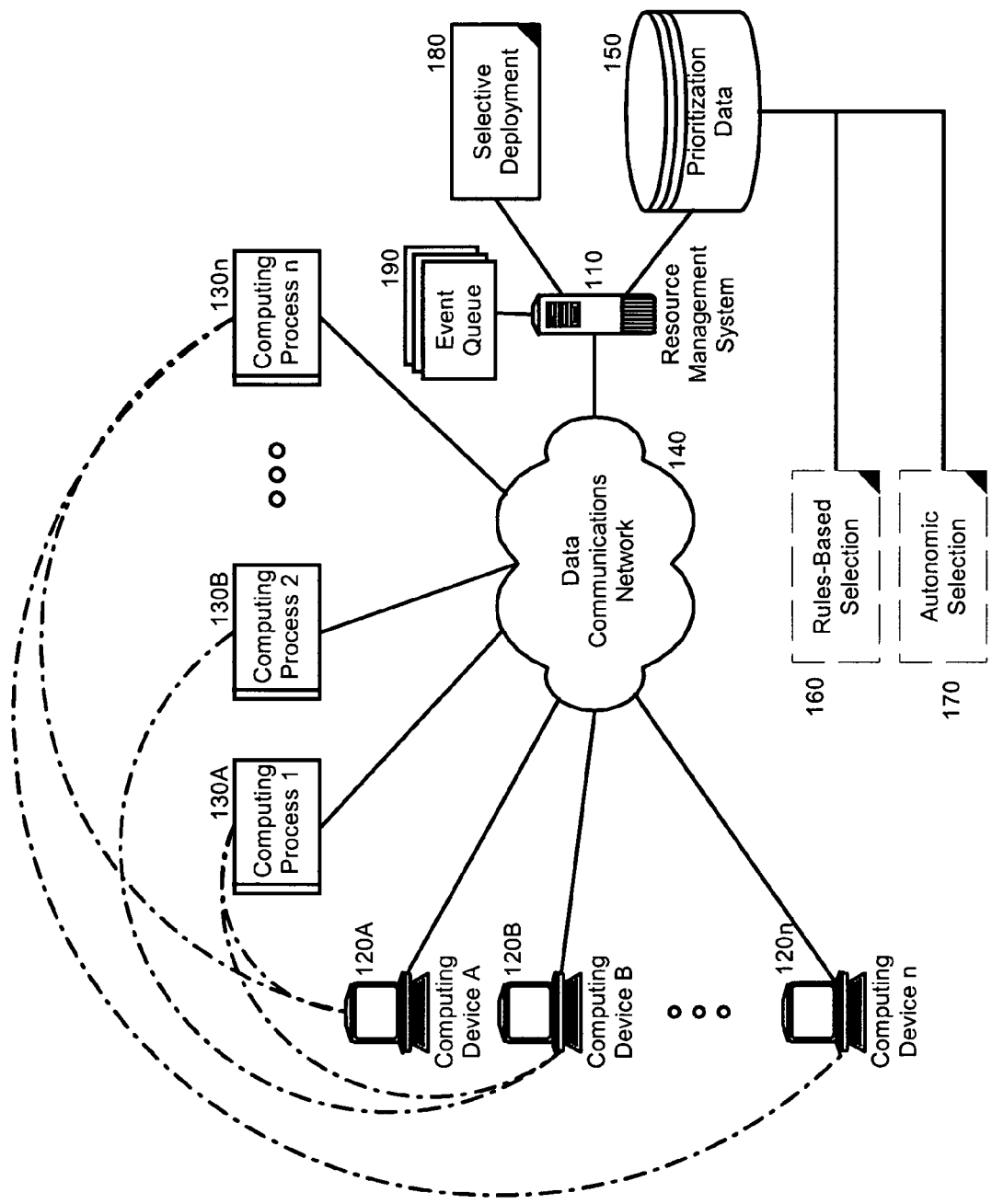
FIG. 1 is a schematic illustration of an application component distribution configured for prioritized component distribution in accordance with a preferred aspect of the invention; and, FIG. 2 is a flow chart illustrating a process for prioritizing the distribution of application components to client computing processes in the system of FIG. 1.

In further illustration of a preferred embodiment of the present invention, FIG. 1 is a schematic illustration of an application component distribution configured for prioritized component distribution. The system of FIG. 1 can include a resource management system 110 configured for communicative coupling to one or more client computing devices 120A, 120B, 120n over a data communications network 140. The client computing devices 120A, 120B, 120n can host computing logic and can include any logic processing device, such as a personal computer, a server computer, a handheld computer or a virtual computer managed to utilize a portion of resources of a larger computing entity. In this regard, the client computing devices 120A, 120B, 120n can be configured to host the operation of application components.

The resource management system 110 can be programmed to manage the operation of resources about one or more data communications networks, including the data communications network 140. The resources can include hardware resources, such as database storage, physical and virtual memory and communications bandwidth. Additionally, the resources can include computing applications operating about the data communications network 140. To that end, the resource management system 110 can maintain responsibility for updating and patching application components operating in client computing devices 120A, 120B, 120n responsive to maintenance events detected in the data communications network 140 and optionally queued for consideration in the event queue 190.

Importantly, the resource management system 110 can include a selective deployment processor 180 and a set of prioritization data 150 for use by the selective deployment processor 180. Specifically, the prioritization data 150 can include information for determining which of the client computing devices 120A, 120B, 120n are to receive a deployment of an application component at what time. More particularly, the prioritization data 150 can specify a priority for application component deployments based upon which the selective deployment processor 180 can determine which of the client computing devices 120A, 120B, 120n are to first receive the deployment of an application component or components before others of the client computing devices 120A, 120B, 120n.

The prioritization data 150 can be collected based upon any number of methods, including manual methods, automated, rules-based methods, and autonomic methods. In the case of the manual methods, an operator can manually insert records in the prioritization data 150 suitable for indicating which of the client computing devices 120A, 120B, 120n are to receive a prioritized deployment of an application component or components. In the case of the latter two methods, either or both of a rules-based selection processor and an autonomic selection processor 170 can be coupled to the prioritization data 150.

The rules-based selection processor 160 can be programmed with rules for identifying ones of the client computing devices 120A, 120B, 120n which are to receive prioritized treatment in deploying one or more application components or updates to the application component or components. Specifically, the rules can be based upon an association between one or more of the client computing devices 120A, 120B, 120n and one or more computing processes 130A, 130B, 130n determined to be important computing processes. In this regard, each of the computing processes 130A, 130B, 130n can be a business process such as is known in the art. As such, the participation of or reliance by one or more client computing devices 120A, 120B, 120n in one or more specified computing processes 130A, 130B, 130n known to be important can justify the prioritization of the deployment of an application component to those specific client computing devices 120A.

Unlike the rules-based selection processor 160, the autonomic selection processor 170 can observe the operation of the client computing devices 120A, 120B, 120n in reference to their respective interactions with one or more of the computing processes 130A, 130B, 130n. The autonomic selection processor 170 further can monitor the computing processes 130A, 130B, 130n to formulate a dynamic and continuing determination of which of the computing processes 130A, 130B, 130n are more important if not critical in nature. Using this information, individual ones of the client computing devices 120A, 120B, 120n can receive priority treatment to receive application component deployments where the individual client computing devices 120A, 120B, 120n participate in one or more "key" computing processes 130A, 130B, 130n.

Figure 2:
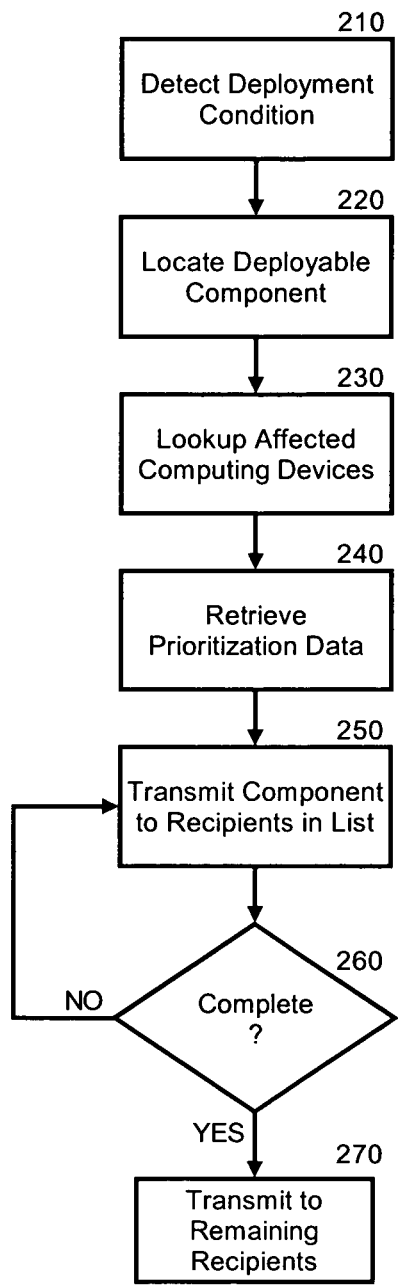

Referring now to FIG. 2, FIG. 2 a flow chart is shown which illustrates a process for prioritizing the distribution of application components to client computing processes in the system of FIG. 1. Beginning in block 210, a deployment condition can be detected, for instance an event can be retrieved from the event queue which indicates a need to deploy an enhancement or upgrade to a distributed application by way of the distribution of one or more application components. In block 220, the application component or components to be deployed can be located in fixed storage (whether locally or remotely) and prepared for distribution about the data communications network.

In block 230, the affected client computing devices can be determined which are to receive the application components. In block 240, prioritization data can be determined for the affected client computing devices. Subsequently, in block 250 the application component or components can be deployed to those client computing devices which enjoy a higher priority than others of the client computing devices which have been determined to be affected by the deployment condition. If in decision block 260 the deployment to the prioritized client computing devices is complete, in block 270 the application component or components can be optionally distributed to the remaining ones of the affected client computing devices. In any case, it is important to note that in a very large scale distribution, the prioritization process described herein can be repeated several times to continually ensure that higher priority devices receive the deployments more quickly than lower priority devices.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. An application component distribution system comprising:
    a resource management system configured to manage communicatively coupled client computing devices over a computer communications network;
    a data store arranged to store prioritization data specifying which of said client computing devices are to first receive distributions of specified application components, wherein the prioritization data is determined based on association of the client computing devices with selected computing processes that are affected by the specified application components;
    a selective deployment processor programmed to detect a deployment event requiring deployment of an application component, the deployment event indicating a need to deploy at least one of an enhancement and a upgrade of a distributed application, to determine selected ones of the client computing devices requiring the application component in response to detecting the deployment event, to retrieve prioritization data from the data store for the selected ones of the client computing devices determined to require the application component, to selectively deploy the application component to said selected ones of the client computing devices based upon said prioritization data, so that the selected ones of the computing devices with a higher priority of receiving application components according to the prioritization data receive the application component before others of the computing devices;
    a rules-based selection processor programmed to populate said data store with prioritization data based upon an application of prioritization rules to the operation of computing processes and associated ones of said client computing devices; and,
    an autonomic selection processor programmed to populate said data store with prioritization data based upon autonomically acquired information regarding the operation of computing processes and associated ones of said client computing devices.

2. The system of claim 1, further comprising an event queue coupled to said resource management system and configured to queue deployment events.

3. A method for prioritized application component distribution, the method comprising the steps of:
   detecting a deployment event requiring deployment of an application component to communicatively coupled client computing devices, the deployment event indicating a need to deploy at least one of an enhancement and a upgrade of a distributed application;
   determining selected ones of the client computing devices requiring the application component in response to detecting the deployment event;
   retrieving prioritization data from a data store for the selected ones of the client computing devices determined to require the application component; and,
   selectively deploying the application component to the selected ones of the client computing devices based upon the prioritization data determined according to one of an association between said selected one of the client computing devices and selected computing processes that are affected by the application component, an application of prioritization rules to the operation of computing processes and associated ones of said client computing devices, and autonomically acquired information regarding the operation of computing processes and associated ones of said client computing devices, so that the selected ones of the computing devices with a higher priority of receiving application components according to the prioritization data receive the application component before others of the computing devices.

4. The method of claim 3, wherein said selected computing processes are critical business processes.

5. The method of claim 4, wherein said association is a participation by said selected ones of the client computing devices in said critical business processes.

6. The method of claim 3, wherein detecting the deployment event requiring deployment of the application component further comprising the steps of:
   retrieving an event from an event queue; and,
   determining said event to be the deployment event.

7. The method of claim 3, wherein selectively deploying the application component to the selected ones of the client computing devices based upon the prioritization data determined according to the association between said selected one of the client computing devices and selected computing processes that are affected by the application component further comprises the manual application of the association.

8. The method of claim 3, wherein selectively deploying the application component to the selected ones of the client computing devices based upon the prioritization data determined according to the application of prioritization rules to the operation of computing processes and associated ones of said client computing devices, further comprises forming rules for establishing a prioritization of the communicatively coupled client computing devices; and,
   processing said rules to establish said prioritization of each of the client computing devices.

9. The method of claim 3, wherein selectively deploying the application component to the selected ones of the client computing devices based upon the prioritization data determined according to autonomically acquired information regarding the operation of computing processes and associated ones of said client computing devices further comprises the steps of:
   observing the operation of said computing processes;
   determining which of said computing processes are critical based upon said observing step; and,
   prioritizing client computing devices which are associated with said computing processes which are determined to be critical.

10. A machine readable storage device having stored thereon a computer program for prioritized application component distribution, the computer program comprising a routine set of instructions which when executed by a machine cause the machine to perform the steps of:
   detecting a deployment event requiring deployment of an application component to communicatively coupled client computing devices, the deployment event indicating a need to deploy at least one of an enhancement and a upgrade of a distributed application;
   determining selected ones of the client computing devices requiring the application component in response to detecting the deployment event;
   retrieving prioritization data from a data store for the selected ones of the client computing devices determined to require the application component; and,
   selectively deploying the application component to the selected ones of the client computing devices based upon the prioritization data determined according to one of an association between said selected one of the client computing devices and selected computing processes that are affected by the application component, an application of prioritization rules to the operation of computing processes and associated ones of said client computing devices, and autonomically acquired information regarding the operation of computing processes and associated ones of said client computing devices, so that the selected ones of the computing devices with a higher priority of receiving application components according to the prioritization data receive the application component before others of the computing devices.

11. The machine readable storage device of claim 10, wherein said selected computing processes are critical business processes.

12. The machine readable storage device of claim 11, wherein said association is a participation by said selected ones of the client computing devices in said critical business processes.

13. The machine readable storage device of claim 10, wherein detecting the deployment event requiring deployment of the application component further comprising the routine set of instructions for causing the machine to further perform the steps of:
   retrieving an event from an event queue; and,
   determining said event to be the deployment event.

14. The machine readable storage device of claim 10, wherein selectively deploying the application component to the selected ones of the client computing devices based upon the prioritization data determined according to the association between said selected one of the client computing devices and selected computing processes that are affected by the application component further comprises the manual application of the association.

15. The machine readable storage device of claim 10, wherein selectively deploying the application component to the selected ones of the client computing devices based upon the prioritization data determined according to the application of prioritization rules to the operation of computing processes and associated ones of said client computing devices, further comprises forming rules for establishing a prioritization of the communicatively coupled client computing devices; and,
   processing said rules to establish said prioritization of each of the client computing devices.

16. The machine readable storage device of claim 10, wherein selectively deploying the application component to the selected ones of the client computing devices based upon the prioritization data determined according to autonomically acquired information regarding the operation of computing processes and associated ones of said client computing devices further comprises the steps of:
   observing the operation of said computing processes;
   determining which of said computing processes are critical based upon said observing step; and,
   prioritizing client computing devices which are associated with said computing processes which are determined to be critical.

\* \* \* \* \*